United States Patent [19]
Hunt

[11] Patent Number: 6,101,546
[45] Date of Patent: Aug. 8, 2000

[54] METHOD AND SYSTEM FOR PROVIDING DATA FILES THAT ARE PARTITIONED BY DELIVERY TIME AND DATA TYPE

[75] Inventor: Galen C. Hunt, Bellevue, Wash.

[73] Assignee: Microsoft Corporation, Redmond, Wash.

[21] Appl. No.: 09/079,452

[22] Filed: May 14, 1998

Related U.S. Application Data

[63] Continuation of application No. 08/613,951, Mar. 11, 1996, abandoned.

[51] Int. Cl.[7] .................................................. G06F 13/00
[52] U.S. Cl. ......................... 709/231; 709/236; 370/263; 370/264
[58] Field of Search ................................... 709/231, 236, 709/203; 370/388, 263, 264

[56] References Cited

U.S. PATENT DOCUMENTS

| | | | |
|---|---|---|---|
| 5,539,920 | 7/1996 | Menand et al. | 455/5.1 |
| 5,563,648 | 10/1996 | Menand et al. | 348/13 |
| 5,583,561 | 12/1996 | Baker et al. | 348/7 |
| 5,664,227 | 9/1997 | Mauldin et al. | 707/516 |
| 5,832,231 | 11/1998 | Raman et al. | 709/234 |
| 5,907,683 | 5/1999 | Engelsiepen et al. | 709/231 |
| 5,925,104 | 7/1999 | Elbers et al. | 709/231 |

OTHER PUBLICATIONS

Thomas D. C. Little et al.; Multimedia Synchronization Protocols for Broadband Integrated Services; IEEE Journal on Selected Areas in Communications; vol. 9, Issue 9; pp. 1368–1382, Dec. 1991.

Extended Micro Channel for Realtime Multimedia Applications; IBM TDB; vol. 35, Issue 5; pp. 8–10, Oct. 1992.

Jack Keith, "Video Demystified—A Handbook for the Digital Engineer", Second Edition, Harris Semiconductor, High-Text :Publications, San Diego, 1995, pp. 503–632.

"Video for Windows Development Kit 1.1 Programmers Guide," Chapter 4—Reading and Writing AVI Files, pp. 1–47, Chapter 5—Customer File Handlers, pp. 1–20, Chapter 6—AVI File Structure, pp. 1–18, 1992–1996.

"Attaching RealAudio Files to Web Pages," pp. 1–6, "RealAudio SDK FAX," pp. 1–7, RealAudio Server 2.0 Technical Specifications, pp. 1–3, Progressive Networks Web Site, 1996.

"Inside Macintosh—Quick Time," Addison–Wesley Publishing Company, Apple Computer, Inc., 1996, pp. 1–1 to 14; 2–1 to 2–38 and 2–61 to 2–62; 2–378 to 2–383; 4–1 to 4–46.

*Primary Examiner*—Kenneth R. Coulter
*Attorney, Agent, or Firm*—Lee & Hayes, PLLC

[57] ABSTRACT

A file is logically partitioned into data channels where each data channels holds a sequence of data of a particular data type. The data channels are logically partitioned into delivery times. The format of the file explicitly sets forth the synchronization between the data channels and the delivery times of data held within the channels. The file format is especially well adapted for use in a distributed environment in which the file is to be transferred from a server to a client. Channel handlers are provided at the client to process respective data channels in the file. The channel handlers are data type specific in that they are constructed to process data of an associated data type. The data in the file may be rendered independently of the delivery time of the data.

40 Claims, 7 Drawing Sheets

METHOD AND SYSTEM FOR PROVIDING DATA FILES THAT ARE PARTITIONED BY DELIVERY TIME AND DATA TYPE

RELATED APPLICATIONS

This is a continuation of U.S. patent application Ser. No. 08/613,951, filed Mar. 11, 1996, entitled "Method and System for Providing Data Files That Are Partitioned by Delivery Time and Data Type," by inventor Galen C. Hunt, now abandoned. Priority to the filing date of that application is hereby claimed.

TECHNICAL FIELD

The present invention relates generally to computer systems and, more particularly, to file formats used in computer systems.

BACKGROUND OF THE INVENTION

Servers must often provide audio and video data to a client computer. In most conventional systems, the audio data and the video data are stored as separate files and are transferred from the server to the client via commands. The file formats for the audio data file and the video data file do not indicate the delivery time for the data and do not explicitly set forth synchronization between the audio data and video data. Generally, a user must identify how much audio data is to be transferred per a frame of video data. The commands are then used to synchronize and complete the transfer of data from the server to the client.

SUMMARY OF THE INVENTION

In accordance with a first aspect of the present invention, a method is practiced on a computer system that has a server, a client and one or more output devices. A sequence of data is partitioned in a file at the server into units of delivery time. The data is delivered in the sequence to the client according to the units of delivery time. The data is then rendered at the output device independently of when the data was delivered.

In accordance with another aspect of the present invention, a file is stored on a storage device in a computer system. The file is logically organized into channels such that each channel holds data of a given data type. Each channel is logically partitioned into corresponding units of delivery time such that for each unit of delivery time each channel holds any data that is to be delivered during that unit of delivery time. The data from the file is transferred to the destination by concurrently transferring data from each of the channels on a per delivery time basis. In particular, for each unit of delivery time, any data in each of the channels for the unit of delivery time is concurrently delivered to the destination.

In accordance with a further aspect of the present invention, video data is stored in a file on a storage device such that the video data is logically partitioned at the units of delivery time. Audio data to accompany the video data is also stored in the file. The audio data is similarly logically partitioned into units of delivery time. The audio data is transferred with the video data to a destination on a logical unit of time basis such that for each successive unit of delivery time any of the audio data and the video data for that unit of delivery time is transferred.

In accordance with yet another aspect of the present invention, a file is stored on a storage device of a server in a distributed system. The file is logically partitioned into channels wherein each channel holds data of a given data type. Each channel is logically partitioned into corresponding units of delivery time such that for each unit of delivery time each channel holds any data that is to be delivered during the unit of delivery time. Channel handlers are provided on the client to process data in a channel of a specific data type. The data from the file at the server is transferred to the client by concurrently transferring data from each of the channels in a per delivery time basis such that for each unit of delivery time any data in each of the channels for the unit of delivery time was concurrently delivered to the client. The transferred data is a process of the client using the channel handlers.

BRIEF DESCRIPTION OF THE DRAWINGS

A preferred embodiment of the present invention will be described below relative to the following figures.

DETAILED DESCRIPTION OF THE INVENTION

The preferred embodiment of the present invention provides a synchronized presentation format for data files in which logical data channels and units of delivery time are explicit in the file format. The delivery time of data in the file is independent of when the data is rendered so as to enable the available bandwidth of the delivery mechanism to be better exploited. The synchronized presentation format allows the storage of multiple data channels in a file wherein each data channel constitutes a single complete unit of deliverable media. For example, a device independent bitmap may be stored in a first channel of a file and a WAVE file may be stored in a second channel of a file. Each of the data channels is divisible into logical units of delivery time (denoted as "ticks"). Data fragments from all channels marked for the same tick are delivered and processed within the tick. This organization facilitates the determination of the requisite bandwidth required for the data held in the synchronized presentation format file, and explicitly sets forth the delivery sequence and synchronization. This file organization greatly simplifies the transfer of related multiple media to a client by explicitly setting forth delivery times and by relieving the server of synchronization responsibilities.

Figure 1:
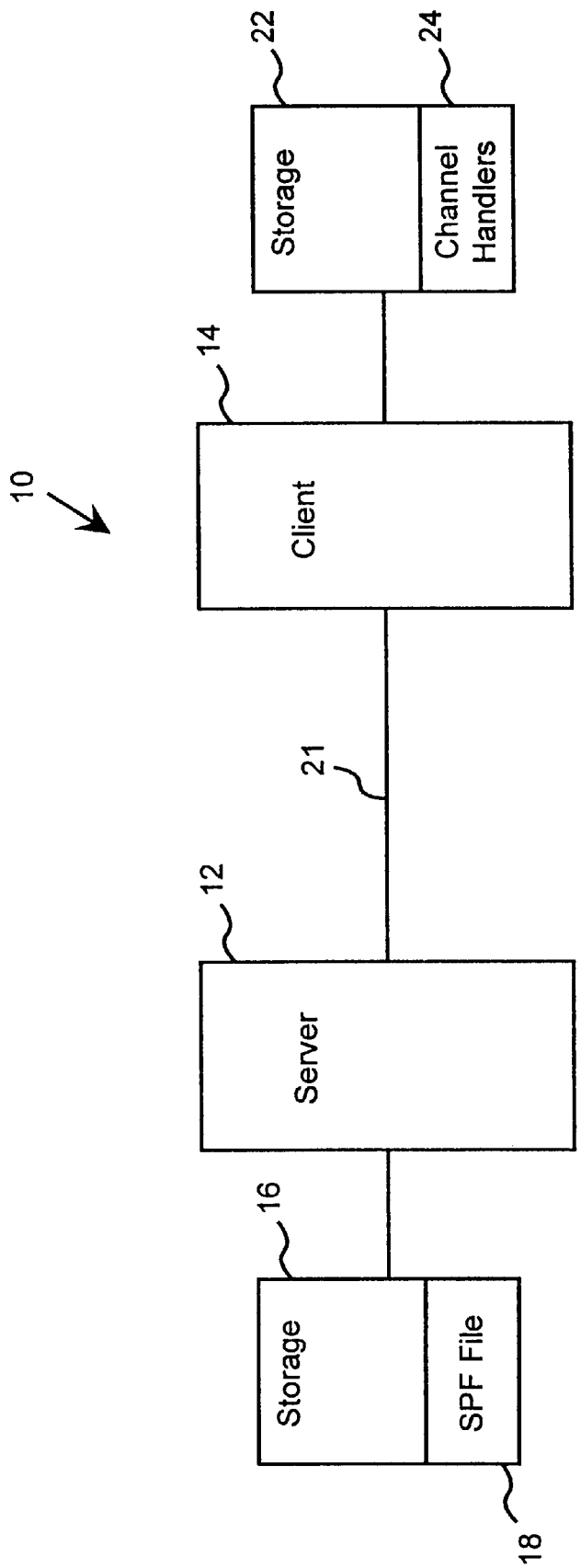
FIG. 1 is a block diagram of a distributed system that is suitable for practicing the preferred embodiment to the present invention.

FIG. 1 is a block diagram illustrating a suitable computer system 10 for practicing the preferred embodiment of the present invention. The computer system 10 includes a server 12 and a client 14, which may be implemented as separate computers. The server 12 includes a storage 16 that holds a synchronized presentation format file 18. The server 12 is coupled to the client 14 via network connection 21. The client 14 also includes a storage 22 that holds one or more channel handlers 24. As will be described in more detail below, each channel handler is responsible for processing data of a given channel data type. Those skilled in the art will appreciate that the computer system configuration shown in FIG. 1 is intended to be merely illustrative, and that the present invention may be practiced with other computer system configurations.

Figure 2:
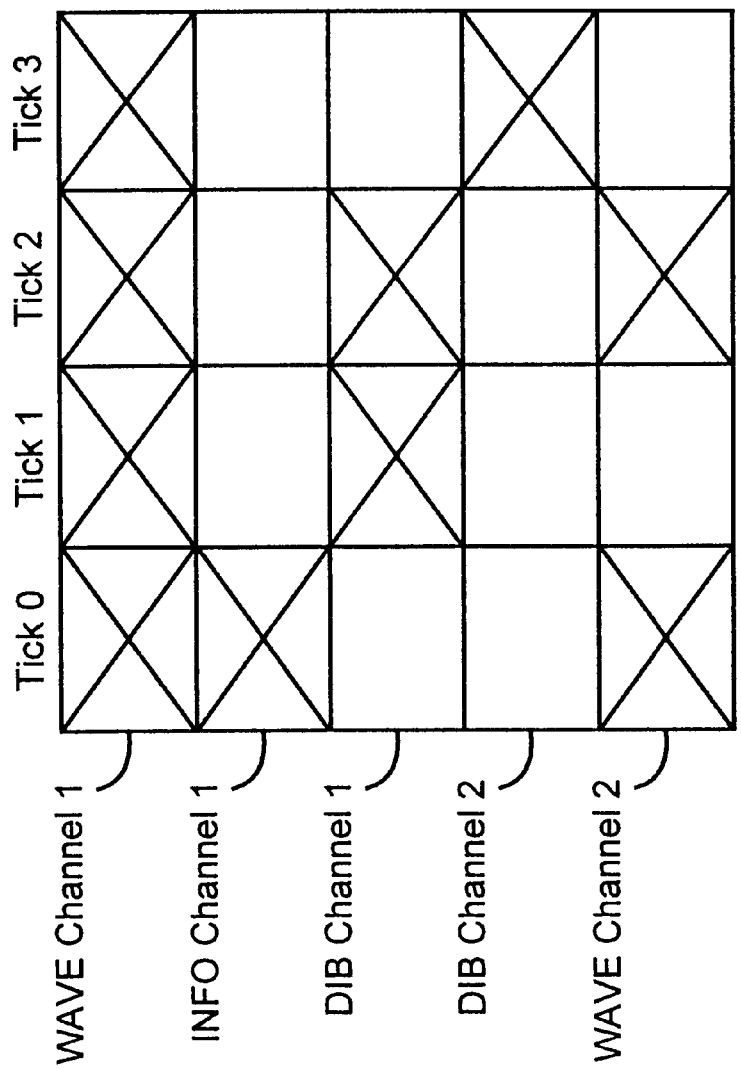
FIG. 2 depicts the logical organization of an example synchronized presentation format file in accordance with the preferred embodiment to the present invention.

The logical organization of the synchronized presentation format file of the preferred embodiment of the present invention may be illustrated by way of example. FIG. 2 shows an example of the logical organization of such a file. The file shown in FIG. 2 is divisible into five channels. Each channel has a unique label that identifies the data type held within the channel and a numerical identifier. Thus, the "WAVE channel 1" is the first data channel that holds a WAVE sequence of audio data. The "WAVE channel 2" channel holds a second sequence of WAVE data. The "DIB channel 1" and "DIB channel 2" channels hold device independent bitmaps. "INFO channel 1" holds copyright information. The preferred embodiment of the present invention supports a number of different channel types. These channel types include a WAVE channel type for holding WAVE audio data, a DIB channel type for holding device independent bitmaps of still frame video, an INFO channel type for holding copyright information, a file channel type for holding files that are to be downloaded, and an execution channel type for holding information that tells a client to take a file that has been downloaded and to run the file. Those skilled in the art will appreciate that these channel types are intended to be merely illustrative and not limiting of the present invention.

As can be seen in FIG. 2, each of the data channels is divisible into ticks. As was mentioned above, a tick is a logical unit of delivery time. For example, a tick may correspond with one second or with another predetermined fixed duration of time. In the preferred embodiment of the present invention, all ticks have a like duration, and the duration of a tick is fixed per file. The ticks are organized sequentially such that tick 0 precedes tick 1, which in turn precedes tick 2, etc. The X's shown in FIG. 2 indicate that the data channel has data to be delivered during the corresponding tick. For example, during tick 0, "WAVE channel 1," "INFO channel 1" and "WAVE channel 2" all have data to be delivered. "DIB channel 1" and "DIB channel 2," however, do not have data to deliver during tick 0.

Figure 3:
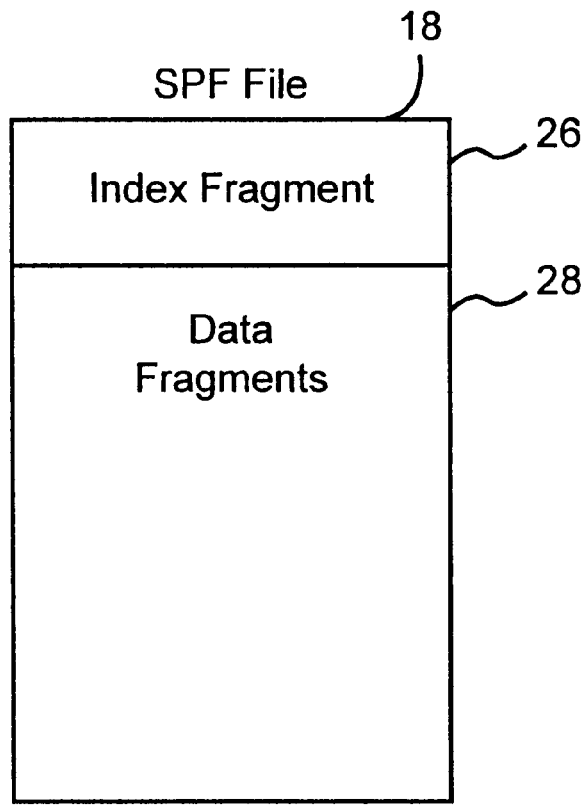
FIG. 3 illustrates the organization of a synchronized presentation format file.
Figure 4:
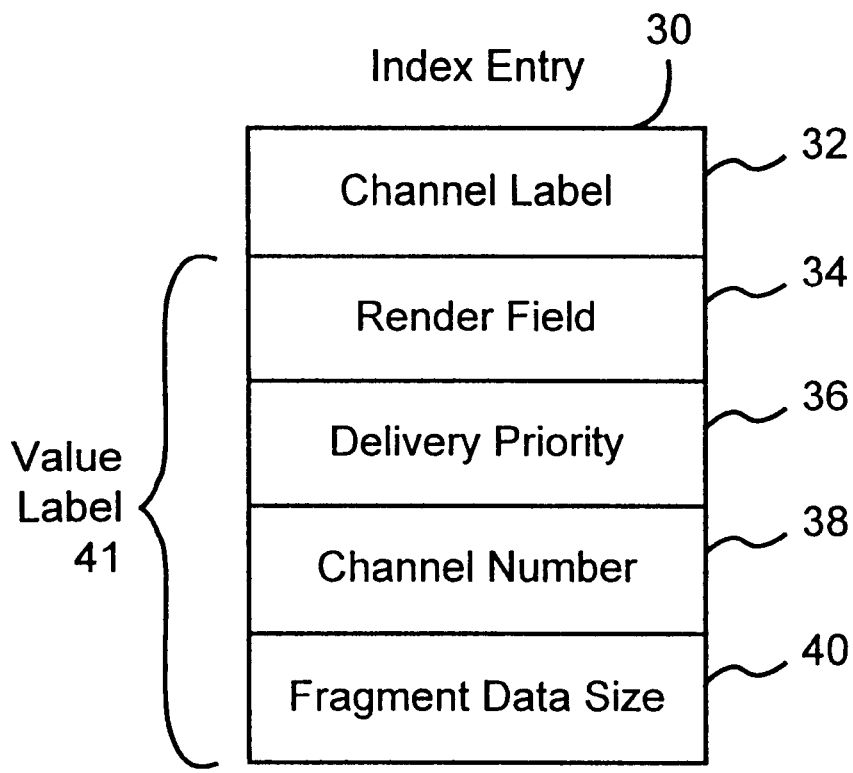
FIG. 4 illustrates the field in an index entry of a synchronized presentation format file.

FIG. 3 shows the actual file organization of a synchronized presentation format file 18. Each synchronized presentation format file 18 includes an initial index fragment 26 that is followed by one or more data fragments 28. The index fragment is composed of a number of index entries. Each index entry describes either an index fragment or a data fragment. The index entries are especially useful to the channel handlers in processing transferred data. As shown in FIG. 4, each index entry 30 includes five fields. The channel label field 32 is the sequence of ASCII characters that describe the type of data in the channel. For example, the channel labels may include "WAVE," "INFO," "DIB," "FILE," "EXEC" and "spf".

The index entry 30 also includes a render field 34 that specifies whether data in the associated fragment is to be rendered or, alternatively, is to be cached for future use. The delivery priority field 36 specifies the numerical priority of the associated fragment. A normal priority for data fragments is zero (which is the lowest priority). In contrast, the normal priority for an index priority is the highest priority, because the index fragment must be delivered before the subsequent data fragments may be processed.

The channel number field 38 specifies the number of the channel as an unsigned integer. Channels of like data types are numbered in sequential order beginning with 1. The fragment data size field 40 holds a value that specifies the size in bytes of the associated fragment. The render field 34, delivery priority field 36, channel number field 38 and fragment data size field 40 are packed together into a single unsigned integer, known as the value label 41, that has the same number of bytes as the channel label field 32.

In order to gain a better appreciation of the synchronized presentation format, it is helpful to consider an example. The following is an example of a portion of a file in the synchronized presentation format:

| File Position | Description | | | | |
|---|---|---|---|---|---|
| 0 | Index Fragment | | | | Fragment |
| | Label | Render | Priority | Channel # | Data Size |
| 0 | spf\0 | 0 | Maximum | 1 | 160 |
| 8 | WAVE | 0 | 0 | 1 | 18 |
| 16 | INFO | 1 | 0 | 1 | 54 |
| 24 | tick | 0 | 0 | 0 | 1 |
| 32 | WAVE | 1 | 0 | 1 | 1024 |
| 40 | DIB | 0 | 0 | 1 | 13 |
| 48 | tick | 0 | 0 | 0 | 2 |
| 56 | WAVE | 1 | 0 | 1 | 768 |
| 64 | DIB | 1 | 0 | 1 | 512 |
| 72 | tick | 0 | 0 | 0 | 3 |
| 80 | WAVE | 1 | 0 | 1 | 1024 |
| 96 | DIB | 0 | 0 | 2 | 512 |
| 104 | tick | 0 | 0 | 0 | 4 |
| 112 | WAVE | 1 | 0 | 1 | 768 |
| 120 | DIB | 1 | 0 | 2 | 512 |
| 128 | 18 bytes of WAVE 1 unrendered data for tick 0. | | | | |
| 146 | 54 bytes of INFO 1 data for tick 0. | | | | |
| 200 | 1024 bytes of WAVE 1 data for tick 1. | | | | |
| 1224 | 13 bytes of DIB 1 data for tick 1 | | | | |
| 1337 | 768 bytes of WAVE 1 data for tick 2. | | | | |

In the example given above, the first four bytes of the synchronized presentation format file, like all synchronized presentation format files, contain the values "s", "p", "f", "\0", respectively. Assuming a label width of four bytes, the next four bytes contain the value label for the index fragment, "spf\0". The index fragment entry is immediately followed by index entries for all the data channels in the synchronized presentation file format. In the example above, each index entry is eight bytes in length. Thus, in the example given above, the index fragment entry is followed by an index entry for WAVE channel 1. The next index entry is an index entry for INFO channel 1. The two index entries that follow the index fragment entry are for initialization fragments for the channels. These entries are, in turn, followed by index entries for respective ticks. As is illustrated above, a separate index entry is provided for each tick. The tick index entry is followed by an index entry for each channel that has data to be delivered during the associated tick.

The index entries are followed sequentially by the data fragments that are labeled by the index entries. Thus, the initialization data fragments are the first data fragments that follow the index entries.

Figure 5:
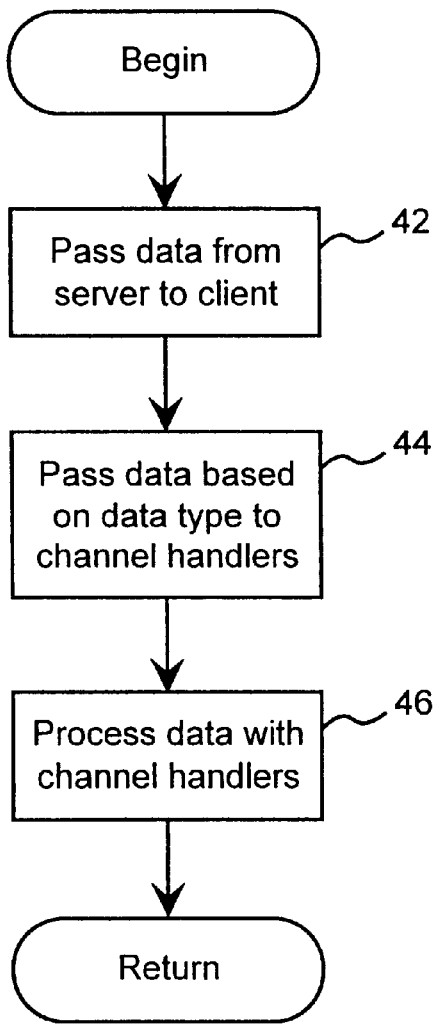
FIG. 5 is a flow chart illustrating the high level steps that are performed in transferring a synchronized presentation format file from a server to a client.

The synchronized presentation format for files is especially helpful when transferring data from a server to a client across a network. FIG. 5 shows a flowchart that illustrates the high level steps that are performed in such a transfer. Initially, the data is passed from the server 12 to the client 14 over the network connection 21 (step 42 in FIG. 5). The client computer then passes the data based on data type to the appropriate channel handlers 24 (step 44 in FIG. 5). The channel handlers process the data to render it or cache the data (step 46). For example, a WAVE channel handler may output the data to an audio output device, such as a loudspeaker. On the other hand, a DIB channel handler may display the device independent bitmap on a video display.

Figure 6:
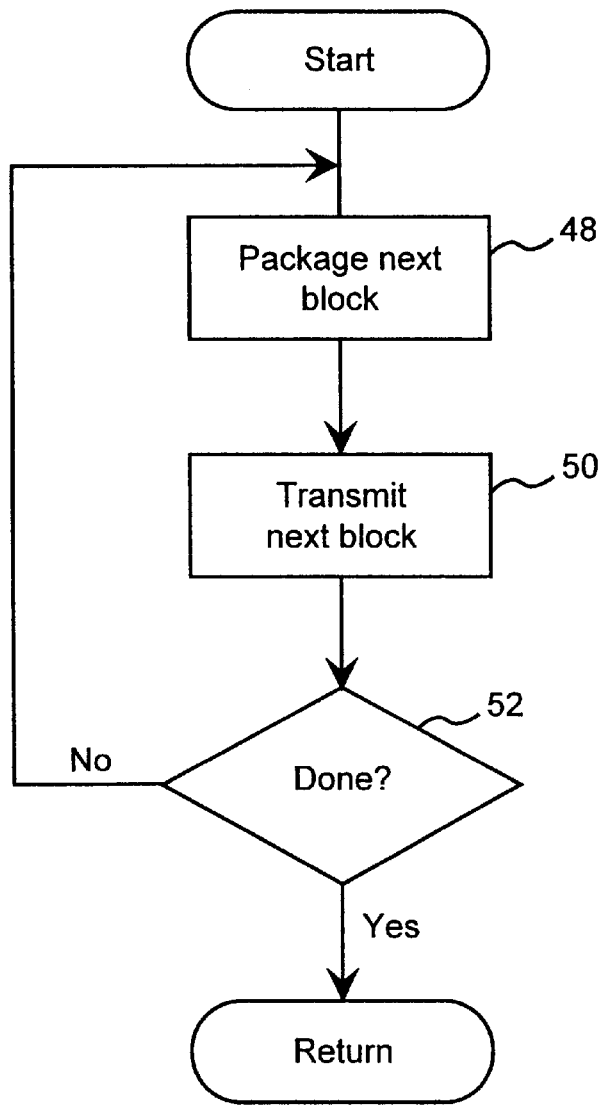
FIG. 6 is a flow chart illustrating how data is transferred in blocks for a synchronized presentation format file.

When a synchronized presentation format file is delivered across the network connection 21, it is delivered in blocks where each block holds data for a fixed number of ticks that is equal to the block delivery time. For example, a block may hold the data for two ticks. FIG. 6 is a flowchart that illustrates the steps that are performed to transmit the data from the server to the client (see step 42 in FIG. 5). Initially, the data for the block that is to be transmitted is packaged into a block (step 48 in FIG. 6). The packaging may occur on a per demand basis or, alternatively, may be completed before any blocks are transmitted. The block is then transmitted over the network connection (step 50). The system checks whether there are any more blocks to be transmitted (step 52). If there are additional, blocks to be transferred, the next block is packaged and transmitted (see steps 48 and 50 in FIG. 6).

An example is helpful to illustrate how the data is packaged into blocks. An example of the packaging of blocks with a block play time of two ticks for the previously given synchronized presentation format file is set forth below.

Block 0: (Initialization Tick)

File Position Description

| 0 | Index Fragment | | | Fragment |
|---|---|---|---|---|
| | Label | Render | Priority | Channel # | Data Size |
| 0 | spf\0 | 0 | Maximum | 1 | 24 |
| 8 | WAVE | 0 | 0 | 1 | 18 |
| 16 | INFO | 1 | 0 | 1 | 54 |
| 24 | 18 bytes WAVE 1 unrendered data for tick 0. | | | | |
| 42 | 54 bytes of INFO 1 data for tick 0. | | | | |
| 96 | End of block. | | | | |

Block 1:

File Position Description

| 0 | Index Fragment | | | Fragment |
|---|---|---|---|---|
| | Label | Render | Priority | Channel # | Data Size |
| 0 | spf\0 | 0 | Maximum | 1 | 56 |
| 8 | tick | 0 | 0 | 0 | 1 |
| 16 | WAVE | 1 | 0 | 1 | 1024 |
| 24 | DIB | 0 | 0 | 1 | 13 |
| 32 | tick | 0 | 0 | 0 | 2 |
| 40 | WAVE | 1 | 0 | 1 | 768 |
| 48 | DIB | 1 | 0 | 1 | 512 |
| 56 | 1024 bytes of WAVE 1 rendered data for tick 1. | | | | |
| 1080 | 13 bytes of DIB 1 unrendered data for tick 1. | | | | |
| 1093 | 768 bytes of WAVE 1 rendered data for tick 2. | | | | |
| 1861 | 512 bytes of DIB 1 rendered data for tick 2. | | | | |
| 2373 | End of block. | | | | |

Block 2:

File Position Description

| 0 | Index Fragment | | | Fragment |
|---|---|---|---|---|
| | Label | Render | Priority | Channel # | Data Size |
| 0 | spf\0 | 0 | Maximum | 1 | 56 |
| 8 | tick | 0 | 0 | 0 | 3 |
| 16 | WAVE | 1 | 0 | 1 | 1024 |
| 24 | DIB | 0 | 0 | 2 | 512 |
| 32 | tick | 0 | 0 | 0 | 4 |
| 40 | WAVE | 1 | 0 | 1 | 768 |
| 48 | DIB | 1 | 0 | 2 | 512 |
| 56 | 1024 bytes of WAVE 1 rendered data for tick 3. | | | | |
| 1080 | 512 bytes of DIB 2 unrendered data for tick 3. | | | | |
| 1592 | 768 bytes of WAVE 1 rendered data for tick 4. | | | | |
| 2360 | 512 bytes of DIB 2 rendered data for tick 4. | | | | |
| 2872 | End of block. | | | | |

As can be seen from the above example, each block includes an index fragment that includes index entries for the index fragment and data fragments in the block. These blocks are followed by the data fragments. Each block is terminated by an end of block indicator. The blocks are transmitted in sequence until all of the blocks have been transmitted.

Figure 7:
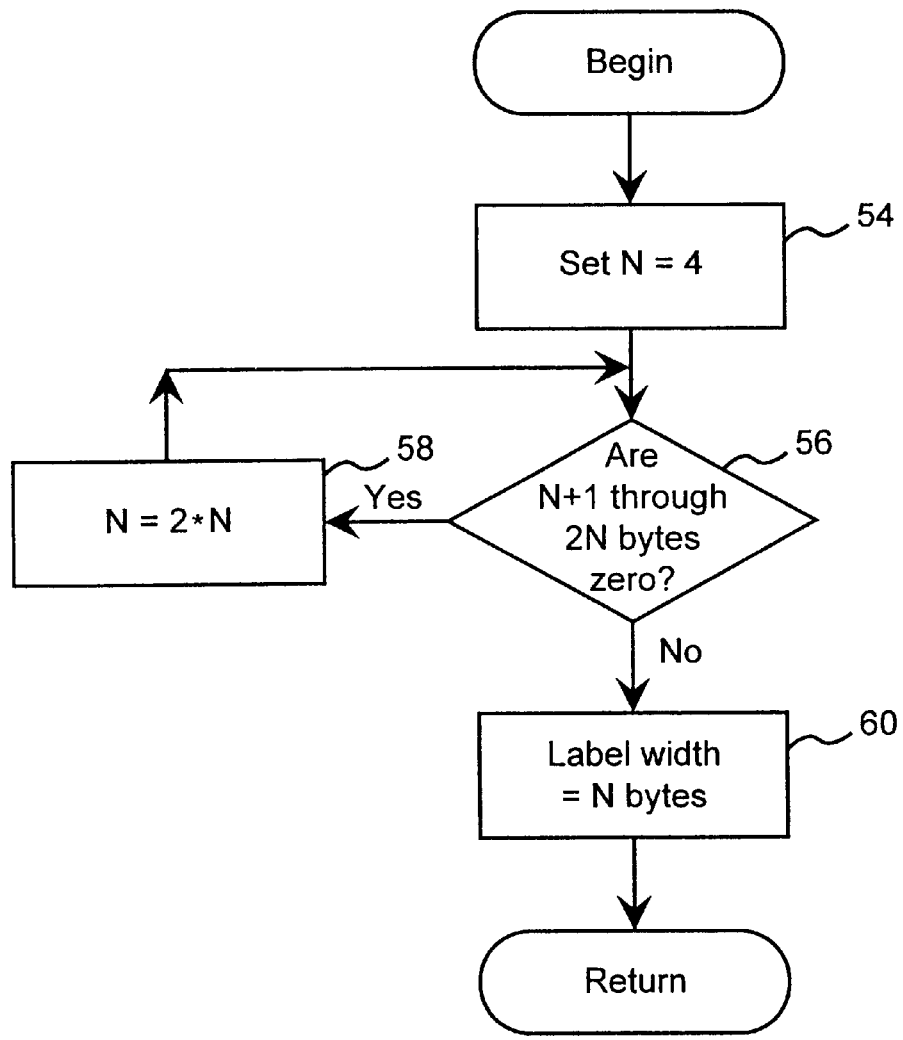
FIG. 7 is a flow chart illustrating the steps that are performed to determine label width for a synchronized presentation format file.

When the client computer 14 receives data for a synchronized presentation format file, it is not certain how many bytes are contained in the channel label. The size of the channel label may vary. In order to determine the label width, the client performs the steps shown on the flowchart of FIG. 7. Initially, the client assumes that the label width is four bytes (the smallest possible label width). In FIG. 7, the variable N is set to have a value of 4 in step 54. The variable N specifies the current guess in bytes of the label width. If the label width is four bytes, the four bytes that follow the first four bytes (i.e., bytes N+1 through 2N) will be non-zero. Thus, in step 56, it is determined whether these bytes are zero. If the bytes are not zero, the label width is four bytes (step 60). However, if these bytes are zero, the estimate of label width is doubled by multiplying the value of N (step 58 in FIG. 7). It is then checked whether the N+1 through 2N bytes are zero or not (step 56). When N is eight, the ninth through sixteenth bytes are examined to determine if they are zero. If these bytes are non-zero, the label width is eight bytes (step 60). This process is repeated until the non-zero bytes are located.

While the present invention has been described with reference to a preferred embodiment thereof, those skilled in the art will appreciate that various changes in form and detail may be made without departing from the intended scope of the invention as defined in the appended claims.

What is claimed is:

1. A method comprising:

partitioning a plurality of data objects into data units with corresponding delivery times;

creating a data file containing the data units and their corresponding delivery times;

delivering the data units from a server to a client in accordance with the delivery times of the data units;

the data objects including at least one object containing streaming data and at least one object containing non-streaming data.

2. A method as recited in claim 1, wherein the streaming data includes video data.

3. A method as recited in claim 1, wherein the streaming data includes audio data.

4. A method as recited in claim 1, wherein the streaming data includes video and audio data.

5. A method as recited in claim 1, wherein the non-streaming data includes still image data.

6. A method as recited in claim 1, wherein the non-streaming data includes an image bitmap.

7. A method as recited in claim 1, wherein the non-streaming data includes textual data.

8. A method as recited in claim 1, wherein the non-streaming data includes copyright data.

9. A method as recited in claim 1, wherein the streaming data includes video and audio data and the non-streaming data includes textual data.

10. A method as recited in claim 1, wherein the streaming data includes video and audio data and the non-streaming data includes a still image bitmap.

11. One or more computer-readable media containing a data file, the data file comprising:
   a plurality of data objects that are partitioned into data units;
   delivery times corresponding to the data units;
   the data objects including at least one object containing streaming data and at least one object containing non-streaming data;
   the delivery times indicating relative times at which the corresponding data units are to be delivered from a server to a client.

12. One or more computer-readable media as recited in claim 11, wherein the streaming data includes video data.

13. One or more computer-readable media as recited in claim 11, wherein the streaming data includes audio data.

14. One or more computer-readable media as recited in claim 11, wherein the streaming data includes video and audio data.

15. One or more computer-readable media as recited in claim 11, wherein the non-streaming data includes still image data.

16. One or more computer-readable media as recited in claim 11, wherein the non-streaming data includes an image bitmap.

17. One or more computer-readable media as recited in claim 11, wherein the non-streaming data includes textual data.

18. One or more computer-readable media as recited in claim 11, wherein the non-streaming data includes copyright data.

19. One or more computer-readable media as recited in claim 11, s wherein the streaming data includes video and audio data and the non-streaming data includes copyright data.

20. One or more computer-readable media as recited in claim 11, wherein the streaming data includes video and audio data and the non-streaming data includes a still image bitmap.

21. A method comprising:
   storing a file on a storage device, said file being logically partitioned into a plurality of channels, wherein each channel holds data of a given data type and each channel is partitioned into corresponding units of delivery time such that for each unit of delivery time, each channel holds data that is to be delivered during the unit of delivery time;
   transferring the data from each of the channels on a per delivery time basis such that, for each unit of delivery time, any channel data for the unit of delivery time is concurrently delivered to a destination;
   wherein at least one of the channels holds data of a streaming data type and at least another of the channels holds data of a non-streaming data type.

22. A method as recited in claim 21, wherein said streaming data type comprises a video data type.

23. A method as recited in claim 21, wherein said streaming data type comprises an audio data type.

24. A method as recited in claim 21, wherein said streaming data type s comprises video and audio data.

25. A method as recited in claim 21, wherein said non-streaming data type comprises a still image data type.

26. A method as recited in claim 21, wherein said non-streaming data type comprises a bitmap type.

27. A method as recited in claim 21, wherein said non-streaming data type comprises a textual data type.

28. A method as recited in claim 21, wherein said non-streaming data type comprises copyright data.

29. A method as recited in claim 21, wherein said streaming data type comprises video and audio data and said non-streaming data type comprises a textual data type.

30. A method as recited in claim 21, wherein said streaming data type comprises video and audio data and said non-streaming data type comprises a bitmap data type.

31. One or more computer-readable media containing a data file, the data file comprising:
   a plurality of data channels, wherein each data channel holds data of a given data type and each channel is partitioned into corresponding units of delivery time such that for each unit of delivery time, each channel holds data that is to be delivered during the unit of delivery time;
   wherein at least one of the channels holds data of a streaming data type and at least another of the channels holds data of a non-streaming data type.

32. One or more computer-readable media as recited in claim 31, wherein said streaming data type comprises a video data type.

33. One or more computer-readable media as recited in claim 31, wherein said streaming data type comprises an audio data type.

34. One or more computer-readable media as recited in claim 31, wherein said streaming data type comprises video and audio data.

35. One or more computer-readable media as recited in claim 31, wherein said non-streaming data type comprises a still image data type.

36. One or more computer-readable media as recited in claim 31, wherein said non-streaming data type comprises a bitmap type.

37. One or more computer-readable media as recited in claim 31, wherein said non-streaming data type comprises a textual data type.

38. One or more computer-readable media as recited in claim 31, wherein said non-streaming data type comprises copyright data.

39. One or more computer-readable media as recited in claim 31, wherein said streaming data type comprises video and audio data and said non-streaming data type comprises a textual data type.

40. One or more computer-readable media as recited in claim 31, wherein said streaming data type comprises video and audio data and said non-streaming data type comprises a bitmap data type.

* * * * *

UNITED STATES PATENT AND TRADEMARK OFFICE
CERTIFICATE OF CORRECTION

PATENT NO. : 6,101,546
DATED : August 8, 2000
INVENTOR(S) : Hunt

It is certified that error appears in the above-identified patent and that said Letters Patent is hereby corrected as shown below:

Column 7,
Line 49, before "wherein" delete "s".

Column 8,
Line 9, before "comprises" delete "s".

Signed and Sealed this

Thirtieth Day of July, 2002

*Attest:*

*Attesting Officer*

JAMES E. ROGAN
*Director of the United States Patent and Trademark Office*